UNITED STATES PATENT OFFICE.

AUGUST JONAS AND EDUARD TSCHUNKUR, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING PINACONE.

1,068,777.  Specification of Letters Patent.  Patented July 29, 1913.

No Drawing.   Application filed September 1, 1911.  Serial No. 647,249.

*To all whom it may concern:*

Be it known that we, AUGUST JONAS and EDUARD TSCHUNKUR, doctors of philosophy, chemists, citizens, respectively, of the German Empire and the Empire of Russia, residing at Leverkusen, near Cologne, Germany, have invented new and useful Improvements in Processes of Producing Pinacone, of which the following is a specification.

The present invention relates to a new and valuable process for producing a pinacone from a ketone such as acetone, which process consists in treating ketones with aluminium amalgam with or without the addition of agents promoting the reaction, such as iodin, chlorin or its compounds such as chloroform, bromoform, $CCl_4$, $Cl_3$-C-C-$Cl_3$, chloral, chloralhydrate, $SbCl_3$, etc.

The aluminium amalgam can be used already formed; or metallic aluminium in a finely divided form and mercuric chlorid can be used, the aluminium becoming amalgamated on the surface only by this process.

In order to illustrate the new process more fully the following example is given, the parts being by weight:—In a vessel provided with a reflux condenser and a stirrer 50 parts of aluminium powder or shavings, 500 parts of acetone and 10 parts of mercuric chlorid are heated to boiling during one hour. Subsequently in the course of 10 hours a solution of 20 parts of mercuric chlorid in 500 parts of acetone is added to the mixture drop by drop. Boiling is then continued for two hours. When the reaction is complete the organo-aluminium compound is decomposed by the addition of water, the mixture is heated to boiling, the precipitate is removed by filtration, acetone is distilled off and the pinacone is precipitated from the remaining mass as its hydrate by the addition of water.

The foregoing process can advantageously be carried out in the presence of a non-reactive diluent, such as benzene, toluene, etc., and when such a diluent is used less acetone is necessary than when the process is carried out in the absence of such a diluent, and by thus avoiding an excess of acetone in the reaction, the formation of undesirable by-products is prevented.

We claim:—

1. Process of producing a pinacone from a ketone which comprises treating such ketone with aluminium amalgam to form an organo-aluminium compound, and decomposing the resulting organo-aluminium compound, substantially as described.

2. Process of producing a pinacone from a ketone which comprises treating such ketone with aluminium amalgam in the presence of an agent promoting the reaction to form an organo-aluminium compound, and decomposing the resulting organo-aluminium compound, substantially as described.

3. Process of producing pinacone from acetone which comprises treating acetone with aluminium amalgam to form an organo-aluminium compound, and decomposing the resulting organo-aluminium compound, substantially as described.

4. Process of producing pinacone from acetone which comprises treating acetone with aluminium amalgam in the presence of an agent promoting the reaction to form an organo-aluminium compound, and decomposing the resulting organo-aluminium compound, substantially as described.

5. Process of producing a pinacone from a ketone which comprises treating such ketone with mercuric chlorid and metallic aluminium to form an organo-aluminium compound, and decomposing the resulting organo-aluminium compound, substantially as described.

6. Process of producing a pinacone from a ketone which comprises treating such ketone with mercuric chlorid and metallic aluminium in the presence of an agent promoting the reaction to form an organo-aluminium compound, and decomposing the resulting organo-aluminium compound, substantially as described.

7. Process of producing pinacone from acetone which comprises treating acetone with mercuric chlorid and metallic aluminium to form an organo-aluminium compound, and decomposing the resulting organo-aluminium compound, substantially as described.

8. Process of producing pinacone from acetone which comprises treating acetone with mercuric chlorid and metallic aluminium in the presence of an agent promoting the reaction to form an organo-aluminium compound, and decomposing the resulting organo-aluminium compound, substantially as described.

In testimony whereof we have hereunto set our hands in the presence of two subscribing witnesses.

AUGUST JONAS. [L. S.]
EDUARD TSCHUNKUR. [L. S.]

Witnesses:
CHAS. J. WRIGHT,
L. NUFER.